May 16, 1967 F. E. WHITE, JR 3,319,857
SOUND FILM MAGAZINE
Filed Aug. 23, 1963 3 Sheets-Sheet 1
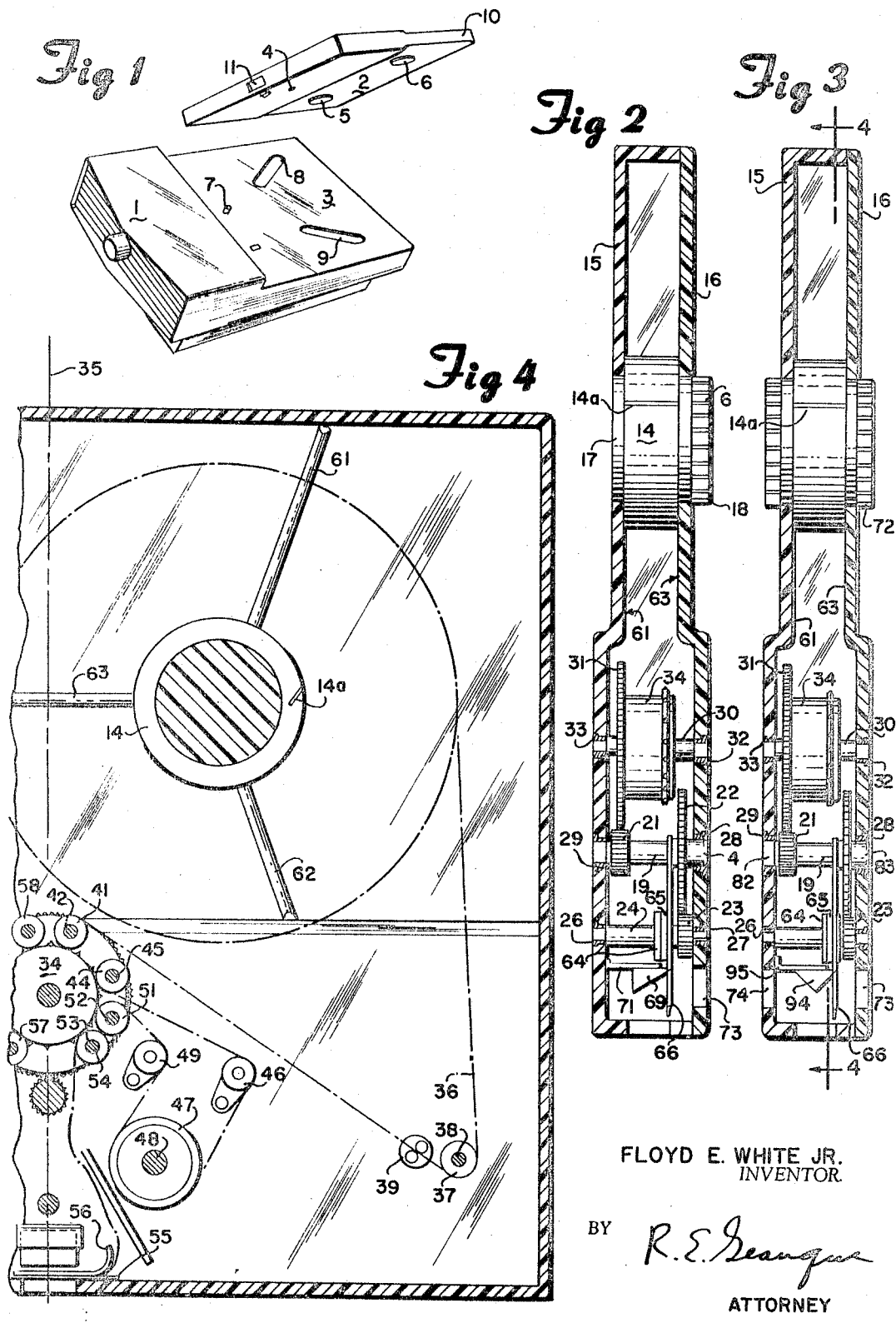
FLOYD E. WHITE JR.
INVENTOR.
BY R. E. Beaugure
ATTORNEY

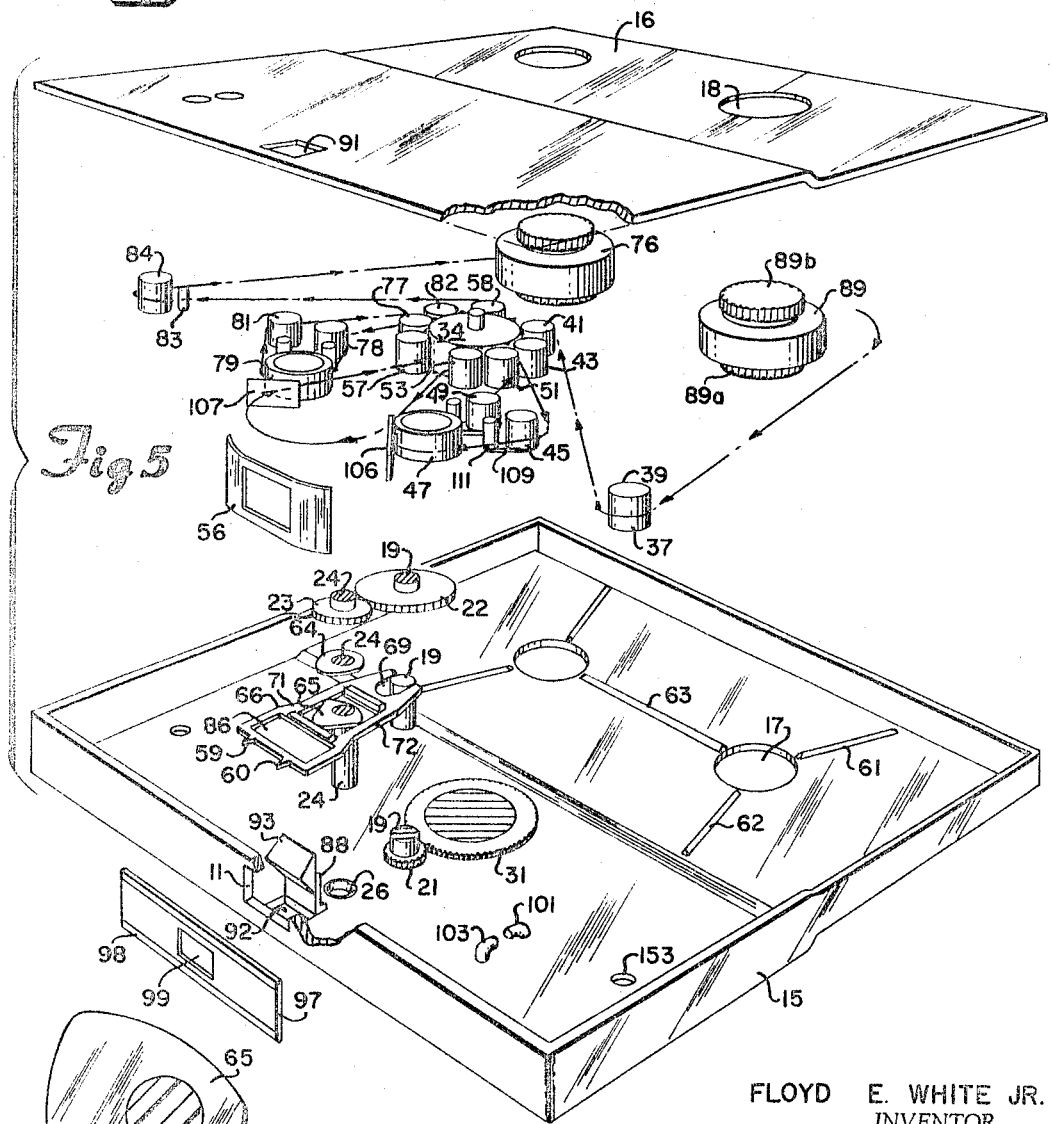

May 16, 1967 F. E. WHITE, JR 3,319,857
SOUND FILM MAGAZINE
Filed Aug. 23, 1963 3 Sheets-Sheet 3
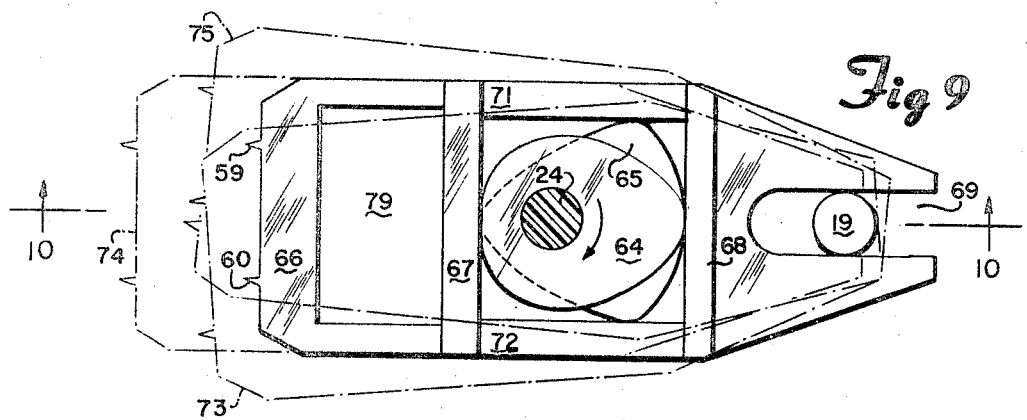
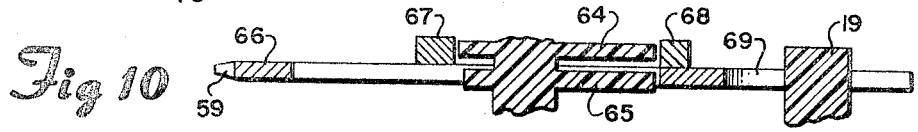
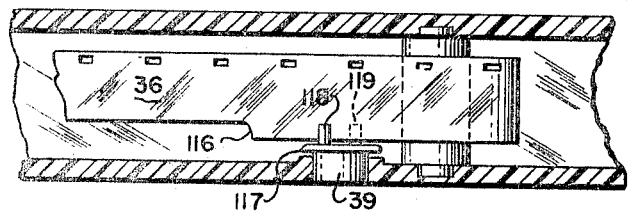
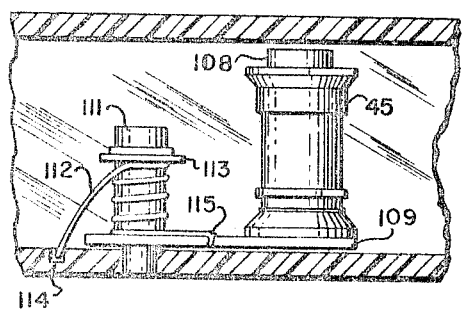
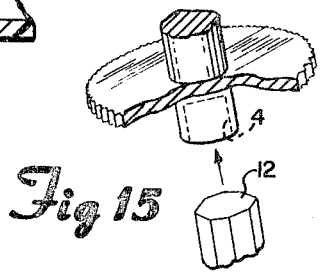
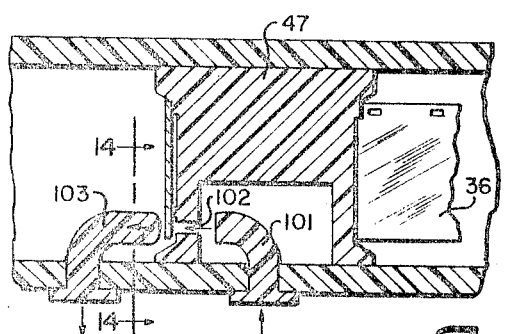
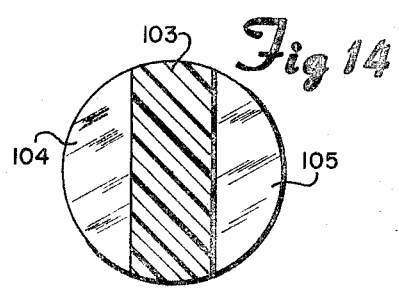
FLOYD E. WHITE JR
INVENTOR.
BY R. E. Geaugue
ATTORNEY

United States Patent Office 3,319,857
Patented May 16, 1967

3,319,857
SOUND FILM MAGAZINE
Floyd E. White, Jr., Placentia, Calif.
(20248 Lantana Drive, Huntington Beach, Calif. 92646)
Filed Aug. 23, 1963, Ser. No. 304,107
4 Claims. (Cl. 226—73)

This invention relates to motion picture projection apparatus and more particularly to a cartridge or magazine containing sound motion picture film which may be easily attached to, or removed from a projector and which obviates threading and/or rewinding, thus saving time and facilitating the projection of the film.

The present invention completely eliminates the usually encountered problems of threading a projector by providing a removable film magazine containing the film, a drive mechanism, sound drums, an intermittent mechanism and a gate through which the film is initially threaded at the film laboratory thus obviating film handling during any number of subsequent projections. By merely attaching the magazine to the projector, an untrained projectionist may easily operate the projector with little or no instructions. Perfect synchronization of pictures and sound is assured since the film gate and the sound drum are integral parts of the magazine and it is unnecessary for the projectionist to perform any threading operation therebetween. Since manual threading and direct handling of the film is eliminated, and since the film is protected from contaminants, its life is greatly increased. A library of magazines, each containing film of different subject matter, may be used in supplying individual magazines to educational institutions, homes, language schools and governmental agencies, each of which would be provided with a projector adapted for use with the magazine of the present invention.

In order to provide a single magazine with a full-length feature film, or photoplay it is preferred that the film be of the type disclosed in copending application Ser. No. 216,669, filed Aug. 13, 1962, wherein the film has two rows of images, called image ranks, and two associated sound tracks. The separate image ranks may face in the same or opposite directions, as determined by the separate end use requirements described in the aforementioned patent application.

While the magazine of the present invention may be used with a variety of projectors, it is preferred that the magazine of the invention be used with a projector of the type disclosed in copending application Ser. No. 304,-023, filed Aug. 23, 1963, now Patent No. 3,269,763. The magazine of the present invention together with a suitable projector comprises an integrated system with numerous cooperating elements which insure highly reliable operation. The light source, lens, shutter, prime mover and sound amplifier are contained within the projector, while the magazine contains the film supply and take-up means, the intermittent mechanism, the drive sprocket, the filmgate, and the sound drum. Means are provided for insuring the proper registration of the magazine wtih respect to the projection lens and for directing the light from the projector through the filmgate in the magazine. Means also are provided whereby the picture areas of the film are maintained in proper registration with the filmgate, so that adjustments are unnecessary. Although the film moves intermittently through the filmgate, the apparatus of the invention provides for constant speed of movement of the film as it passes over the sound drum when the magazine is in position. Simple, positive guiding and connecting surfaces are provided on the projector for the reception and attachment of the magazine. Since the magazine is symmetrical about its transverse centerline and since the film may optionally carry two parallel ranks of pictures or images, the magazine may be turned over after viewing one-half of the total program and the remaining half of the program may be viewed, thus eliminating rewinding at the end of projection.

The magazine of the present invention may optionally carry film having either a single row of images, or superimposd images from two adjacent rows to simulate three dimensional effects, or double images in adjacent relationship. In addition, synchronized sound also may be provided for each type of image projection and, if desired, stereophonic sound may be reproduced by simultaneously using the two sound tracks carried on the film. The present motion picture magazine therefore has many uses and is extremely flexible in its operation.

It is therefore a principal object of the present invention to provide novel and improved motion pictue film magazine apparatus requiring no threading, handling or rewinding of the motion picture film and being operable by unskilled projectionists.

Another object of the invention is to provide a motion picture film magazine which is capable of showing a variety of film formats, including single standard row of images, superimposed images from two rows or more of images to simulate three dimensional effects, or double images in adjacent relationship, single or dual-rank wide-screen images, etc., and which may reproduce monophonic or stereophonic sound from the sound tracks on the film.

Another object of the invention is to provide a novel and improved film magazine which is inexpensive to produce, simple to operate, relatively light weight, and capable of projecting a full-length photoplay without film threading or rewinding.

Still another object of the invention is to provide a novel and improved motion picture film magazine for accommodating film having either a horizontal or a vertical frame-to-frame film movement.

Another object of the invention is to provide a magazine containing film supported on a pair of rotatable cores, for a motion picture projector, so arranged that the magazine includes not only a filmgate but also a drive sprocket for the film so arranged that the device can be threaded with film before it is attached to a projector and the film will automatically be transferred from one core to the other while moving through the filmgate, during operation of the projector.

Yet another object of the invention is to provide a novel and improved magazine for motion picture film designed to be driven from a source of power in a stationary part of the projector with power connections on the magazine arranged so that they need only be pressed into surface contact with corresponding connections in the projector in order that the source of power within the projector can be used to operate all of the mechanical moving parts within the magazine.

A further object of the invention is to provide a novel magazine for motion picture projectors having an integral intermittent assembly so arranged that whenever the magazine is engaged with a projector no adjustment is necessary in order to have the image frame in proper registration.

A still further object is to provide a novel and improved film magazine which is compact, symmetrical, reversible and adapted for use with a horizontal or vertical format motion picture projector.

Yet another object of the invention is to provide a motion picture film magazine incorporating a novel and improved intermittent and pull-across mechanism which obviates registration and threading difficulties in transporting the film.

It is an object of the invention to provide a motion picture film magazine containing sound motion picture film having means carried within the magazine for providing uniform film movement over a sound pickup head.

A general object of the invention is to provide novel and improved film magazine apparatus which overcomes disadvantages of previous means and methods heretofore intended to accomplish generally similar purposes.

Other objects of the invention will in part be obvious and will in part appear hereinafter.

Many other advantages, features and additional objects of the present invention will become manifest to those versed in the art upon making reference to the detailed description and accompanying sheets of drawings in which preferred structural embodiments incorporating the principles of the present invention are shown by way of illustrative examples. Like numerals refer to like parts throughout the several views. In the drawings:

FIGURE 1 is a perspective view showing the relationship between the film magazine of the present invention and a horizontal format projector.

FIGURE 2 is a cross-sectional view of a first embodiment of a film magazine according to the invention, adapted for non-inverting use.

FIGURE 3 is a cross-sectional view of a modified form of the apparatus of FIGURE 1 adapted for inversion to display inverted dual-rank films.

FIGURE 4 is a fragmentary plan view of a film magazine according to the invention, in which the top is removed.

FIGURE 5 is an exploded view of the device of FIGURE 3 and shows the film path through the internal mechanism.

FIGURE 6 is an elevational view, partially in section, of the shuttle driving cam.

FIGURE 7 is a cross-sectional view taken along line 7 of FIGURE 6.

FIGURE 8 is a cross-sectional view taken along line 8 of FIGURE 6.

FIGURE 9 is a top plan view of the shuttle portion of the invention showing in broken outline, various positions which the shuttle may take during operation.

FIGURE 10 is a cross-sectional view taken along line 10—10 of FIGURE 9.

FIGURE 11 is a fragmentary detail view, partially in section, illustrating certain features of the automatic stop mechanism.

FIGURE 12 is a fragmentary detail view, partially in section, showing certain features of a flutter suppressor as used in the invention.

FIGURE 13 is a fragmentary detail view, partially in section, illustrating an optical sound pickup assembly as used in the invention.

FIGURE 14 is a cross-sectional view taken along line 14—14 of FIGURE 13.

FIGURE 15 is a fragmentary detail view, partially broken away, showing certain details of the power drive coupler mechanism.

It is to be understood that inasmuch as the projector does not constitute part of the instant invention, only so much of the structural details and operational features thereof considered to be essential for a complete understanding of this invention are described hereinafter. A complete description of a projector suitable for use with the present invention is disclosed in the copending application of Floyd E. White, Jr., Ser. No. 304,023, filed Aug. 23, 1963.

With particular reference to FIGURE 1 there is shown a projector, indicated generally by the numeral 1, of the type particularly adapted for projection of film containing horizontally oriented image ranks.

The projector 1 is designed to receive the magazine 2 merely by lowering the magazine 2 vertically onto the mating deck surface 3 of the projector 1 so that the drive coupler 4 and hubs 5 and 6 on magazine 2 extend downwardly through openings 8 and 9, respectively, in deck surface 3. Hubs 5 and 6 will engage a drive belt in projector 1 so that they may be driven in an appropriate direction, as will appear hereinafter. The magazine itself comprises a generally rectangular housing 10 having an aperture 11 in the front sidewall thereof. The film is carried within the magazine on a pair of storage cores which are formed integrally with hubs 5 and 6. Drive spline 7 extends upwardly from the projector 1 and is adapted to engage a mating spline-receiving opening in drive coupler 4.

As can be seen in the cross-sectional view of FIGURE 2, the housing 10 comprises a first enclosing member 15 which may be fabricated from a suitable plastic material formed as an injection molded part. The enclosing member 15 is joined to a cover member 16 which is preferably fabricated from the same material as the enclosing member 15. The film to be contained within the magazine 2 is carried on core 14 which is integral with hub 6 and which may be molded from nylon or other suitable plastic material. Hub 5, not shown in FIGURE 2, is similarly formed to have a core portion for supporting the film. Each core may have a film retaining slot, such as shown at 14a for receiving the end of the film. Each hub has an extended drive portion which is provided with a plurality of drive teeth about its periphery. The drive teeth are adapted to engage a timing belt or similar drive member within the projector 1. Inasmuch as reel hub 6, and members 15 and 16 are fabricated from plastic materials having relatively low co-efficient of friction, and since they revolve at relatively low speed, no separate bearing element is required and the hub is journaled directly in circular apertures 17 and 18 in members 15 and 16, respectively.

As stated hereinbefore the magazine 2 is provided with its own internal intermittent mechanism. Inasmuch as the film will, in a preferred embodiment, have a horizontal format, the intermittent mechanism performs a "pull-across" function, rather than a "pull-down" function as is the case in most conventional motion picture projectors. Rotary power is supplied to the intermittent mechanism, as well as to the internal drive sprocket via a power train comprising drive shaft 19 carrying pinion 21 and drive gear 22. The lower end of shaft 19 is provided with coupling 4 through which rotary power is transmitted from the projector 1. Gear 22 meshes with and turns cam shaft pinion 23. Shaft 24 turns with pinion 23 and is journaled in bearings 26 and 27. Shaft 19 is journaled in bearings 28 and 29.

Pinion 21 drives sprocket gear 31. Shaft 30 rotatably supports gear 31 and sprocket wheel 34, and is journaled within bearings 32 and 33.

With the exception of the sound drums, as will be described hereinafter, the magazine is completely symmetrical from left to right about centerline 35 as shown in FIGURE 4. Since the magazine is essentially symmetrical, only one-half of the magazine is shown in FIGURE 4, the complete magazine 2 being shown in the exploded view of FIGURE 5. With reference to FIGURE 4, and assuming that the right-hand film storage core 14 is serving as the supply core, the film path through the magazine to the take up core is as follows:

One end of film 36 is secured at slot 14a to core 14; from core 14 the film passes over idler roller 37 supported on shaft 38. The film 36 then passes through automatic stop actuator 39 and over pad roller 41. The operation of the automatic stop actuator will be described more completely hereinafter in connection with FIGURE 11. Pad roller 41 is rotatably supported on shaft 42. Pad roller 41 holds the film 36 into engagement with the adjacent sprocket teeth on sprocket wheel 34. The film emerges from the sprocket wheel 34 and passes over pad roller 43. Pad roller 43 is rotatably supported on shaft 44. The film then passes over flutter damper roller 45. The flutter damper assembly will be described more fully hereinafter in connection with FIGURE 12. The film then passes over sound drum 47 which does not rotate, but merely guides the film. Details of the sound drum will be described hereinafter in connection with FIGURE 13.

After leaving the sound drum 47 the film passes over flutter damper roller 49 which may be identical in construction with that of flutter damper roller 45. The film 36 then passes over idler roller 51, rotatably supported on shaft 52, at which point it again engages the sprocket wheel 34. The film re-emerges from the sprocket wheel 34 and passes over pad roller 53 which is rotatably supported on shaft 54.

Between pad roller 53 and the filmgate the film is provided with sufficient slack to permit it to be cyclically pulled across the filmgate aperture 11, one frame at a time, by the intermittent mechanism. The filmgate comprises aperture plate 55 which frames the image projected through aperture 11. Pressure platen 56 is spring loaded to hold the film firmly against aperture plate 55. Upon emerging from the filmgate the film again follows a free loop which terminates at pad roller 57 which is the left-hand symmetrical counterpart of pad roller 53. The portion of the apparatus to the left of centerline 35, as viewed in FIGURE 4, is symmetrically identical to that just described. For example, pad roller 58 is the left-hand symmetrical counterpart of right-hand pad roller 41; the film ultimately is wound upon the take-up film storage core (not shown in FIGURE 4).

Enclosing member 15 is provided with a plurality of integrally formed upwardly extending lands (e.g., 61–63) which support the film wound on the storage cores (e.g. core 14) in order to minimize the frictional load between the film and the housing 10 and to obviate reel flanges. It should be understood that cover member 16, which is omitted in FIGURE 4 for clarity, would also carry a plurality of radially disposed lands which would support the film when the magazine is in an inverted position. As is clearly shown in FIGURE 5 both the right and left film storage cores 89 and 76 are provided with film supporting lands (e.g., 61–63).

Sprocket wheel 34 and gear 31 are supported on shaft 30 and are rotatably driven by pinion 21. Gear 22 also turns with pinion 21. Movement is imparted to upper cam 64 and lower cam 65 by cam shaft pinion 23 which is driven from gear 22. The shuttle which intermittently advances the film 36 has been omitted from FIGURE 4 for clarity.

Looking now at FIGURES 6–8, there is shown cam shaft 24 which is driven via cam shaft pinion 23. Upper cam 64 has one eccentric lobe (see FIGURE 8) and is used to cyclically drive shuttle 66 towards and away from the filmgate (shuttle 66 and cam 64 can be seen in FIGURE 5). As can be seen in FIGURES 9 and 10, shuttle 66 is provided with a pair of transverse cam followers 67 and 68 which are driven by cam 64. One end of shuttle 66 is provided with a notch 69 which slidably and pivotally engages shaft 19. Thus, shaft 19—in addition to being the drive shaft for the gear train—also serves as a guide for shuttle 66. Cam followers 71 and 72 on shuttle 66 are cyclically driven from side-to-side, with respect to the filmgate, by lower cam 65. As can be seen in FIGURE 7, lower cam 65 is somewhat triangular in shape. The combined action of cams 64 and 65 will cause shuttle 66 to follow a compound reciprocatory-transverse motion as indicated in dotted outline at 73–75 in FIGURE 9. Shuttle 66 is provided with a pair of claws 59 and 60 which intermittently engage the perforations in the film 36 as the shuttle moves. A "pull-across" motion is imparted to the film 36 by claws 59 and 60, in response to the cyclical movement of shuttle 66.

Once the film 36 has passed through the filmgate (aperture plate 55 and pressure platen 56) its path is a symmetrical counterpart to the film path described thus far. The complete film path can be seen in FIGURE 5. Specifically, the film 36 emerges from the filmgate and passes over pad rollers 57 and 77. The film 36 then passes over flutter damper roller 78, sound drum 79, and flutter damper roller 81. From roller 81 the film passes around pad rollers 82 and 58, and then emerges from sprocket wheel 34. The film 36 then passes through the left-hand automatic stop actuator 83 and around idler roller 84. From roller 84 the film 36 is wound onto the left-hand (take-up) core 76.

The embodiment of the mechanism described above in connection with FIGURES 2 and 4 is particularly adapted to films which are non-invertable. That is, the image ranks are carried on the film with similar orientation whereby the base of the image of the upper rank is adjacent the top of the image of the lower rank. This arrangement is particularly adapted to the projection of stereoscopic pictures or films in which the first rank of images is projected with the film moving in a first direction (e.g., left to right) and the second rank of images is projected in a reverse direction (e.g., right to left). In this latter arrangement the optical mechanism of the projector is vertically shifted in order to transfer the optical path from the top rank to the bottom rank, or conversely.

Referring again to FIGURE 2, light from the light source in the projector is directed by suitable means upward through window 85 in cover member 16 and then through rectangular opening 86 in shuttle 66. The light entering through window 85 impinges on reflector 87 which, for example, may be a silvered prism to deflect the light to the filmgate and thence outwardly through aperture 11. It should be understood that a mirror, optical flat or other suitable light diverting means may be substituted for prism reflector 87. In the embodiment of FIGURE 2, reflector 87 is shown carried by support member 88 which in turn is attached to the interior surface of enclosing member 15. The aperture plate 55 and the pressure platen 56 are omitted from FIGURE 2 for clarity.

In the event that it is desired to provide a magazine which accommodates a film format having inverted ranks of images, then the embodiment of the invention shown in FIGURE 3, is preferred. This embodiment is substantially the same as that shown in FIGURE 2 except that each of the film storage cores are provided with two outwardly extending drive hubs. For example, core 89 is provided with hubs 89a and 89b, and the housing is provided with two light receiving windows 91 and 92. This will permit the light source to illuminate the film in the filmgate regardless of which side of the magazine is face up. As can be seen in FIGURE 3, a double faced reflector 93 is employed with this embodiment in lieu of the single-faced reflector (87) of FIGURE 2. The reflector (87 or 93) may be coated with a material which selectively transmits infrared radiation (heat) and reflects the visible portion of the spectrum, allowing maximum utilization of the light source without damage to the film. Also, it should be noted that in the embodiment of FIGURE 3, drive shaft 94 is provided with a spline receiving opening 95 and 96 at each end rather than at only one end as shown in connection with shaft 19 of FIGURE 2, thus permitting rotary power to be imparted to the internal mechanism when the magazine is in either its reverse or obverse position.

FIGURE 5 shows the film leaving core 89 and progressing through the magazine onto core 76 which in this case is acting as the film take-up core. In this mode of operation sound drum 79 will be the active sound drum since the sound track customarily leads the corresponding image frame. Typically, an optical sound track leads the image by 26 frames, and a magnetic sound track leads the image by 28 frames, in accordance with the 16-mm. film standards adopted by the American Standards Association.

Motion picture projectors, as they have been constructed in the past, for use with enclosed film magazines have needed a certain amount of adjustment each time the magazine is attached to the projector. This adjustment has generally been required due to the fact that the intermittent mechanism and/or film pull-down mechanism is located within the projector. Such an arrangement necessitates having a part of the projector enter the magazine and suitably register with the film sprocket holes. Inasmuch as the film within the magazine requires a free loop, in order to accommodate the cyclical displacement of the film during the pull-down cycle, exact registration of the projector's intermittent mechanism with the free loop has, heretofore, been somewhat of a problem.

Since the intermittent mechanism is an integral part of the magazine of the present invention, the film is always threaded through the filmgate and is suitably registered with respect to the intermittent mechanism. Furthermore, should any of the exposed moving parts such as the drive coupler 4 or hubs 5 and 6 be inadvertently moved during handling of the magazine, a short length of the film may be caused to move, but such movement will not disturb the film's registration and projection will not be hindered. In this connection, it is important to note that the free loop will remain centered and symmetrical because the shuttle 66 will transport a short length of film if the parts turn due to handling whereas prior systems are subject to possible loss of loop symmetry during handling. From the foregoing description of the improved magazine of the present invention it can be seen that the magazine can be placed in only one position wherein all the operating parts will engage the projector. Thus, it is merely necessary that the operator place the magazine in the only position where it will fit onto the projector. The projector's drive spline (shown at 12 in FIGURE 1) may be hexagonal if the gear train within the magazine is to operate at framing rates of 16 frames per second (f.p.s.) or 24 f.p.s. If it is desired to operate at framing rates of 18 f.p.s. (silent speed) and 24 f.p.s. (sound speed) which is the preferred practice in the industry, then the projector's drive spline should be octagonal. As will be apparent to those versed in the art, the cam shapes or the gear ratio with the magazine may readily be changed in order to provide various pull-across strokes and/or changes in the projection speed (f.p.s.), while maintaining a fixed drive shaft speed.

It should also be noted that the intermittent does not work against the pressure platen (shown at 56 in FIGURES 4 and 5); therefore, the film 36 will be held between the pressure platen and the aperture plate (55) even if the claws (59–60) on the shuttle (66) are not in engagement with the film. This will preclude misalignment during handling or storage.

A sliding framing mask 97, carried within frame 98, is provided to permit minor framing adjustments of the projected image. Frame 98 is attached to the front sidewall of the magazine housing 15. Mask 97 is provided with a framing aperture 99 which may be made slightly smaller than aperture 11 and the aperture in platen 56. Suitable means are provided on the projector for adjusting the relative position of framing aperture 99 with respect to aperture 11, thus properly registering the projected image on the viewing screen.

In view of the desirability of keeping the structure of the magazine as simple as possible the major portion of the sound pickup mechanism is located in the projector.

A sound pickup of any suitable and well-known construction may be used and may comprise separate sub-assemblies which are combined when the magazine is attached to the projector. The magazine may be modified to accommodate either magnetic or optical sound tracks. Assuming that the film is provided with a magnetic track or tracks, the sound pickup head may be made to extend into a sound pickup aperture in the cover member of the magazine and thereby sense the magnetic sound track on the film. It should be understood that two sound pickup heads would be utilized in the event that the film carries dual tracks for stereophonic sound.

If an optical sound track is to be accommodated, then the sound pickup receiving apertures are replaced with the novel pickup coupler shown in FIGURE 13. In the embodiment of the optical sound pickup shown in FIGURE 13, light for illuminating the sound track is communicated to the interior of sound drum 47 from an exciter lamp in the projector via a plastic "light bending pipe" 101. The sound drum 47 is fixed (non-rotating) and is provided with a small aperture 102 through which the sound track on film 36 may be scanned. The pipe 101 is preferably fabricated from solid acrylic plastic rod having a highly polished exterior. One end of light pipe 101 is cemented or otherwise attached in a flush-mounted arrangement in the wall of the magazine. When the magazine is correctly positioned on the projector, this exposed end of pipe 101 will be in registration with the light beam from the projector's exciter lamp. Light pipe 101 is suitably bent or formed to carry the light to the optical sound track as it passes over the sound drum 47. Light transmitted through aperture 102 of the sound track on film 36 is returned to the projector via a second light pipe 103. 103 is similarly attached to the magazine so as to present an exposed end which will register with a photocell aperture in the projector, when the magazine is installed. The function of the scanning slit employed in conventional optical sound pickups is performed by a pair of transverse notches 104 and 105 in light pipe 103, as shown in FIGURE 14. The end of light pipe 103, adjacent the film 36, is curved to have a lens shape. This will act as a lens to focus the sound track in a virtual image plane passing through notches 104–105. These notches (104–105) or constrictions will clip extraneous portions of the magnified sound track image.

While the "light pipe" arrangement described above is preferred, many other simple variations are possible, such as controlling the entering and exiting light beams by mirrors, prisms, fibre optics, etc. The sound drums 47 and 79 are dissimilar to the extent that one track of a dual sound track must be picked up when the film 36 is moving in a first direction, and the second sound track must be picked up when the film 36 is moving in the reverse direction. Thus, the right hand sound drum 47 has its pickup area vertically displaced slightly from that in the left hand sound drum 79, in order to accommodate the appropriate one of the two parallel sound tracks recorded on the film. It should be understood, however, that the sound drums and pickups may be modified to operate properly with many other sound track arrangements, and the above-described arrangement is merely an example.

To prevent extraneous light from the projection lamp from reaching the optical sound pickup, the apparatus may be provided with suitable light shields such as baffles 106–107 as shown in FIGURES 4 and 5.

It is well known that film provided with sprocket holes tends to flutter and vibrate when passing over a sound pickup even when threaded between film rollers and drums in a tight loop. This flutter or vibration may be detected by the sound pickup and seriously degrade the quality of the reproduced sound. Thus, it is necessary to suppress this flutter by providing means for maintaining a uniform velocity of the sound track as it moves over the sound pickup. This is accomplished in accordance with the present invention by means of the flutter damper apparatus shown in FIGURE 12.

Looking now at FIGURE 12, the flutter damper comprises a flutter damper roller 45 which is rotatably supported on shaft 108. Shaft 108 is mounted on arm 109 which in turn is pivotally supported on shaft 111. Helical spring 112 is coiled around shaft 111 between retaining collar 113 and arm 109. One end of spring 112 is restrained by its engagement with a receiving depression 114 in enclosing member 15. The other end of spring 112 is restrained by its engagement with a receiving opening 115 in arm 109. This arrangement will cause arm 109 to be spring biased in a clockwise direction about shaft 111, as viewed in FIGURE 4. This will apply a tension to film 36 which will act to absorb flutter and other speed variations in the film's movement. This arrangement reduces the weight of the magazine over that which would be necessary if a conventional high-mass flywheel stabilization system were to be employed. Flutter damper rollers 49, 78, and 81 function in a similar manner to that just described for flutter damper roller 45.

As described hereinabove, the film preferably has two rows of images and adjacent magnetic or optical sound tracks provided on each longitudinal edge of the film. However, both sound tracks may be located on one side only of the film as in the case of the one sound track on conventional vertical 16 mm. sound film format. The sound tracks are preferably longitudinally displaced and synchronized with a corresponding one of the separate ranks of images. If the images in one rank face in the opposite direction to the image in the other rank then each rank of images may constitute substantially one-half of a full length photoplay. Therefore, the magazine need only be inverted and repositioned onto the projector in order to show both ranks of images and the complete picture. Referring again to the embodiment of FIGURE 3 there is shown a double-45 degree mirror 93 suspended on support 88 from the enclosing member 15 of the magazine. Light entering through the windows 91 or 92 on either side of the magazine will be reflected forward to the appropriate image rank on the film.

If the images of each rank face in the same direction, they may be simultaneously shown either in side-by-side relationship or superimposed on each other to create three-dimensional effects by suitable modification of the optical system, as will be apparent to one skilled in the art.

In a similar manner, the sound tracks may be used separately or simultaneously if stereophonic sound is desired.

Attention is called to the fact that edge guiding of the film is controlled by gravity, thus eliminating special mechanisms required to provide a minimum of film wearing and resultant unstable image projection.

Automatic means are provided for halting the projector 1 at each end of the film. The motor switch is contained in the projector 1 and is controlled via the automatic stop actuators 39 and 83 located in the magazine 2. This mechanism is shown in FIGURE 11. In a preferred embodiment, the film 36 is provided with a cut-out or notch 116 along one edge near the end of the film. Actuator 39 is preferably fabricated from plastic and is journaled within a receiving opening in the magazine wall. It is provided with a flange 117 which prevents it from falling out of the magazine. Also, it is provided with a pair of upwardly extending guides 118–119 between which the film 36 passes. Actuator 39 is adapted to be lightly spring-biased to rest against a taut edge of the film 36. The spring biasing force is externally provided from the projector, as will appear. When the notch 116 in the edge of the film 36 is reached, actuator 39 will move upwardly into the relieved area of the notch. A snap-action switch within the projector is spring-biased upward and senses this motion or displacement of actuator 39 and reverses or stops the motor, as needed. The magazine must then be inverted, or the projector set for transport in the reverse direction.

Two automatic stop actuators (39 and 83) are provided, one on the top and one on the bottom of the magazine. One controls the operation of the projector during projection of the first half of the film and the other controls the projector during projection of the remaining half of the film. Actuator 39 (see FIGURE 4) communicates with the projector via opening 153 (see FIGURE 5). If desired, four such stop actuators may be provided, one for the top and one for the bottom of each side of the magazine, to control the direction of transport. Thus, the magazine will be caused to automatically stop at the end of the film when transporting in either direction. It should be noted that this mechanism will also stop the projector in the event that the film should break, it being actuated in such an eventuality by the absence of the film over the actuator 39 or 83. Furthermore, removal of the magazine from the projector will cause the projector to stop.

While other automatic stop devices may be used, the above described means is preferred since it retains the electrical switching means within the projector, results in a minimum film damage, permits the magazine to be relatively sealed and contain a minimum of parts and circuits. Also, this arrangement minimizes registration problems between the switch and the film sensing means and is failsafe.

From the foregoing description it can be seen that the film storage cores 14 and 76, rollers 37, 41, 43, 51 and 53, sprocket wheel 34, apertures and other elements, with the single exception of the sound drums 47 and 79 (in the event that the sound tracks are non-symmetrically placed), are arranged on and in the magazine 2 in such a manner that the magazine is symmetrical about a transverse plane through the axis of the sprocket wheel 34 and the projection aperture 11. This allows the magazine to be inverted on the projector thus to separately show each rank of images on dual-rank film.

As will now be apparent to those versed in the art, many modifications may be made in the basic invention as hereinabove described. For example, various lengths of film may be accommodated by merely changing the rearwardly extending portion of the magazine containing the film storage cores. Also, it is important to note that the basic magazine structure, while preferred for use with film having a horizontal image format, need not be limited to such image format. Conventional films having vertically oriented images may be contained in the novel magazine of the present invention and projected by means of a horizontal format projector to which has been attached an image rotating device. This attachment may comprise a dove prism or other well-known optical means for rotating an image through 90°. Alternatively, the magazine of the present invention may be mounted for use in a vertical plane merely by providing suitable magazine engaging structures on the projector.

Other modifications will be apparent to those skilled in the art. For example, means may be provided on the rear end wall of the magazine housing for identification of the subject matter of the film contained within the magazine.

It should be noted that the main sprocket wheel 34 is geared to rotate at a reduced speed as compared with the speed of the drive shaft 7 on the projector and that shaft 24 for driving the shuttle 66 is geared at a higher speed than drive shaft 7.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. A motion picture projector magazine having an integral intermittent assembly comprising:
   a housing having sprocketed motion picture film enclosed therein, said film being adapted to be moved within said housing;
   means defining a projection aperture in a wall of said housing through which images from said film may be projected;
   a stationary guide pivot secured within said housing;
   a single-lobed eccentric cam means rotatably mounted in a first plane within said housing and spaced apart from said guide pivot;
   a multi-lobed cam means rotatably mounted in a second plane which is spaced apart from and parallel to said first plane, the axes of rotation of said single-lobed cam and said multi-lobed cam being coaxial;

a unitary shuttle movably supported within said housing in proximity to said aperture defining means;

a guide portion of said shuttle slidably engaging said guide pivot, a first cam follower portion of said shuttle in said first plane slidably engaging said single-lobed eccentric cam means whereby a reciprocating motion may be imparted to said shuttle;

a second cam follower portion of said shuttle located in said second plane slidably engaging said multi-lobed cam means whereby an arcuate side-to-side motion may be imparted to said shuttle about the pivotal axis of said guide pivot; and a claw portion on said shuttle for intermittently engaging said sprocketed film in response to the motions of said shuttle and thereby intermittently move said film past said projection aperture.

2. A motion picture projector magazine having an integral intermittent assembly comprising:

a housing having spocketed motion picture film enclosed therein, said film being adapted to be moved within said housing;

means defining a projection aperture in a wall of said housing through which images from said film may be projected;

a stationary guide pivot secured within said housing;

a multi-lobed eccentric cam rotatably mounted in a first plane within said housing;

a single-lobed cam rotatably mounted in a second plane, within said housing, which is spaced apart from and parallel to said first plane;

drive means for transmitting rotary power from a prime mover external of said housing to said multi-lobed eccentric cam and said single-lobed cam;

a unitary shuttle movably supported within said housing in proximity to said aperture defining means;

a guide portion of said shuttle slidably engaging said guide pivot, a first cam follower portion of said shuttle slidably engaging said multi-lobed eccentric cam in said first plane whereby a reciprocating motion may be imparted to said shuttle;

a second cam follower portion of said shuttle slidably engaging said single-lobed cam in said second plane whereby an arcuate side-to-side motion may be imparted to said shuttle about the axis of said guide pivot when said drive means is rotated; and a claw portion of said shuttle for intermittently engaging said sprocketed film in response to the motions imparted to said shuttle and thereby intermittently advance said film past said aperture.

3. A motion picture projector magazine having an integral intermittent assembly comprising:

a housing having sprocketed motion picture film enclosed therein, said film being adapted to be moved within said housing;

means defining a projection aperture in a wall of said housing through which images from said film may be projected;

a stationary guide pivot secured within said housing;

a single-lobed cam spaced apart from said guide pivot and rotatably mounted within said housing;

a substantially triangular triple-lobed cam mounted within said housing for rotation with said single-lobed cam;

a unitary shuttle movably supported within said housing in proximity to said aperture defining means;

a first cam follower portion of said shuttle slidably engaging only said single-lobed cam whereby a cyclical reciprocatory motion towards and away from said projection aperture may be imparted to said shuttle;

a second cam follower portion of said shuttle slidably engaging only said triple-lobed cam whereby an arcuate side-to-side motion about the axis of said guide pivot may be imparted to said shuttle; and a claw portion of said shuttle for intermittently engaging said sprocketed film in response to motions imparted to said shuttle and thereby intermittently move said film past said aperture.

4. In a substantially symmetrcial film magazine for the projection of sprocketed motion picture film, an intermittent mechanism comprising:

a shuttle comprising;

a relatively flat elongated member having a notch at one end thereof and a plurality of film sprocket engaging claws at the other end thereof;

a first pair of coplanar cam followers located intermediate of said ends of said member in a first plane;

a second pair of coplanar cam followers located intermediate of said ends of said members in a second plane which is spaced apart from and parallel to said first plane, said second pair of cam followers being orthogonally aligned with respect to said first pair of cam followers to define a substantially rectangular opening in said elongate member;

guide means pivotally and slidably engaging said notch for guiding the movement of said elongate member in a given plane;

a rotatable shaft extending through said rectangular opening;

a single-lobed eccentric cam carried on said shaft, in said first plane, for rotation therewith and engaging said first pair of cam followers to impart a cyclical reciprocatory motion, towards and away from said guide means, to said shuttle upon rotation of said shaft;

a multi-lobed cam carried on said shaft in said second plane for rotation therewith and engaging said second pair of cam followers to impart an arcuate side-to-side motion, about the pivotal axis of said guide means, to said shuttle upon rotation of said shaft.

References Cited by the Examiner

UNITED STATES PATENTS

| | | | |
|---|---|---|---|
| 2,173,220 | 9/1939 | Baker | 226—62 |
| 2,552,457 | 5/1951 | Raskin | 226—73 |
| 2,707,416 | 5/1955 | Bolsey | 226—73 |
| 2,732,754 | 1/1956 | Foster et al. | 242—55.13 |
| 2,756,629 | 7/1956 | Isom | 226—62 |
| 3,095,779 | 7/1963 | Foster | 242—55.13 |
| 3,139,789 | 7/1964 | Schrader | 352—72 |
| 3,157,880 | 11/1964 | Easterly et al. | 352—72 |
| 3,187,340 | 6/1965 | Misawa | 242—55.13 X |
| 3,224,656 | 12/1965 | Mitchell | 226—57 |

ROBERT B. REEVES, *Primary Examiner.*

MERVIN STEIN, *Examiner.*

L. D. CHRISTIAN, *Assistant Examiner.*